US009280333B1

(12) United States Patent
Gschwind et al.

(10) Patent No.: US 9,280,333 B1
(45) Date of Patent: *Mar. 8, 2016

(54) SELECTION OF AN ENTRY POINT OF A FUNCTION HAVING MULTIPLE ENTRY POINTS (71) Applicant: International Business Machines Corporation, Armonk, NY (US)

(72) Inventors: Michael K. Gschwind, Chappaqua, NY (US); Ulrich Weigand, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/569,974

(22) Filed: Dec. 15, 2014

Related U.S. Application Data (63) Continuation of application No. 14/501,127, filed on Sep. 30, 2014.

(51) Int. Cl.
G06F 9/44 (2006.01)
G06F 9/445 (2006.01)

(52) U.S. Cl.
CPC .................................. G06F 8/54 (2013.01)

(58) Field of Classification Search
None
See application file for complete search history.

(56) References Cited

U.S. PATENT DOCUMENTS

| 6,199,202 | B1 | 3/2001 | Coutant et al. |
| 6,247,175 | B1 | 6/2001 | Ledford et al. |
| 6,996,808 | B1 | 2/2006 | Niewiadomski et al. |
| 7,213,247 | B1 | 5/2007 | Wilner et al. |
| 2003/0009750 | A1 | 1/2003 | Hundt et al. |
| 2004/0068719 | A1 | 4/2004 | Liu et al. |
| 2006/0112374 | A1 | 5/2006 | Oliva |
| 2007/0157178 | A1 | 7/2007 | Kogan et al. |
| 2008/0092151 | A1 | 4/2008 | Brown |
| 2008/0120590 | A1 | 5/2008 | Wang et al. |
| 2008/0127154 | A1 | 5/2008 | Drepper |

(Continued)

FOREIGN PATENT DOCUMENTS

EP 0690374 A3 1/1996

OTHER PUBLICATIONS

RM0197 Reference manual SH-4 generic and C specific application binary interface, Oct. 2011, www.st.com.*

(Continued)

Primary Examiner — Insun Kang
(74) Attorney, Agent, or Firm — Richard A. Wilhelm; Steven L. Bennett (57) ABSTRACT An object has an unresolved symbol corresponding with a direct first function call in a first module of the object. A loader receives a request to resolve the symbol and identifies a callee function called by the first function call, identifies a second module in which the callee function is located, and determines whether the function call corresponds with one or more properties of two or more properties. The loader returns a first callee function entry point associated with a first property when the first function call has the first property. The loader returns a second callee function entry point associated with a second property when the first function call has the second property. The first and second callee function entry points are for storing in a program linkage table. The request can be received when the first function call is first invoked or when the first module is loaded.

7 Claims, 6 Drawing Sheets (56) References Cited

U.S. PATENT DOCUMENTS

2012/0011371 A1     1/2012    Lee et al.
2013/0263153 A1    10/2013    Gschwind

OTHER PUBLICATIONS

Modra, A., "[Patch 2/9] Change plt stubs to have destination in r12", Message 373, Oct. 30, 2013. Grace Period Disclosure. https://sourceware.org/ml/binutils/2013-10/msg00373.html.

Modra, A., "[Patch 4/9] Add ELFv2 .localentry support", Message 375, Oct. 30, 2013. Grace Period Disclosure. https://sourceware.org/ml/binutils/2013-10/msg00375.html.

Modra, A., "[Patch 5/9] ELFv2 stub, plt and link changes", Message 376, Oct. 30, 2013. Grace Period Disclosure. https://sourceware.org/ml/binutils/2013-10/msg00376.html.

Modra, A., "[Patch 9/9] PowerPC64 ELFv2 support for gold", Message 380, Oct. 30, 2013. Grace Period Disclosure. https://sourceware.org/ml/binutils/2013-10/msg00380.html.

Modra, A., Edit ELFv2 global entry prologue to non-PIC, Message 20, Nov. 4, 2013. Grace Period Disclosure. https://sourceware.org/ml/binutils/2013-11/msg00020.html.

Weigand, U., "[Patch, rs6000] ELFv2 ABI 2/8: Remove function descriptors", Message 1141, Nov. 11, 2013. Grace Period Disclosure. https://gcc.gnu.org/ml/gcc-patches/2013-11/msg01141.html.

Weigand, U., "[Patch] Power PC64 ELFv2 ABI 2/6: Remove function descriptors", Message 315, Nov. 12, 2013. Grace Period Disclosure. https://sourceware.org/ml/libc-alpha/2013-11/msg00315.html.

Weigand, U., "[Patch] Power PC64 ELFv2 ABI 3/6: PLT local entry point optimization", Message 314, Nov. 12, 2013. Grace Period Disclosure. https://sourceware.org/ml/libc-alpha/2013-11/msg00314.html.

Gschwind et al., "Selection of an Entry Point of a Function Having Multiple Entry Points," U.S. Appl. No. 14/501,127, filed Sep. 30, 2014.

Gschwind et al., "Rewriting Symbol Address Initialization Sequences," U.S. Appl. No. 14/527,819, filed Oct. 30, 3014.

Gschwind et al., "Rewriting Symbol Address Initialization Sequences," U.S. Appl. No. 14/570,000, filed Dec. 15, 3014.

Gschwind et al., "Linking a Function With Dual Entry Points," U.S. Appl. No. 14/525,680, filed Oct. 28, 2014.

Gschwind et al., "Linking a Function With Dual Entry Points," U.S. Appl. No. 14/570,010, filed Dec. 15, 2014.

List of IBM Patents or Patent Applications Treated as Related.

* cited by examiner

SELECTION OF AN ENTRY POINT OF A FUNCTION HAVING MULTIPLE ENTRY POINTS

STATEMENT REGARDING PRIOR DISCLOSURES BY THE INVENTOR OR A JOINT INVENTOR

The following disclosures are submitted under 35 U.S.C. 102(b)(1)(A): Messages 373 (2013-10), 375 (2013-10), 376 (2013-10), 380 (2013-10), and 20 (2013-11) posted to the GNU Binutils (assembler and linker) website as mailing list messages. Message 1141 (2013-11) posted to the GCC (compiler) website as a mailing list message. Messages 315 (2013-11) and 314 (2013-11) posted to the glibc (system library and dynamic loader) website as mailing list messages.

BACKGROUND

The present disclosure relates generally to computer systems, and more specifically, to a loader configured to select between a plurality of entry points of a callee function at which a calling function enters.

In computer software, an application binary interface (ABI) describes the low-level interface between an application module and the operating system or between the application module and another application module. The ABI covers details such as data type, size, and alignment; the calling conventions which control how function arguments are passed and how return values are retrieved; the system call numbers and how an application should make system calls to the operating system; and in the case of a complete operating system ABI, the binary format of object files, program libraries, and so on. Several ABIs (e.g., the Interactive Unix ABI allows a wide range of programs to run on a variety of Unix and Linux variants for the Intel x86 architecture) allow an application program from one operating system (OS) supporting that ABI to run without modifications on any other such system, provided that necessary shared libraries are present, and similar prerequisites are fulfilled.

The program development cycle of a typical application program includes writing source code, compiling the source code into object files, building shared libraries, and linking of the object files into a main executable program. Additional preparation, including loading of the main executable program, and loading of the shared libraries for application start-up, occurs before the application is executed on a particular hardware platform.

The compiler works on a single source file (compile unit) at a time to generate object files. The compiler generates object code without knowing the final address or displacement of the code/data. Specifically, the compiler generates object code that will access a table of contents (TOC) for variable values without knowing the final size of the TOC or offsets/addresses of various data sections. Placeholders for this information are left in the object code and updated by the linker. A TOC is a variable address reference table that is utilized, for example in an AIX environment, to access program variables in a manner that supports shared libraries and is data location independent. A similar structure, referred to as a global offset table (GOT), performs a similar function (e.g., indirect and dynamically relocatable access to variables) in a LINUX environment. One difference between a TOC and a GOT is that a TOC may contain actual data, where a GOT only contains addresses (pointers) to data. In the Linux PowerPC 64-bit environment the TOC contains the GOT section plus small data variables.

A static linker combines one or more separately compiled object files derived from distinct source files into a single module, and builds a single GOT and/or TOC for the module that is shared by files in the module. An executing application includes at least one module, a statically linked module typically containing the function main( ) as well as, optionally, several other functions, sometimes also known as the main module. Some applications may be statically linked, that is, all libraries have been statically integrated into the main module. Many applications also make use of shared libraries, sets of utility functions provided by the system or vendors to be dynamically loaded at application runtime and where the program text is often shared between multiple applications.

Each module in a computer program may have a different TOC pointer value. The TOC register or GOT register (referred to hereinafter as the TOC register) may therefore be saved and restored for each function call, either by a procedure linkage table (PLT) stub code segment, or by the callee function in conventions where the TOC register is treated as a preserved (i.e., callee-saved) register.

SUMMARY

Various embodiments are directed to computer-implemented method performed by a loader having a resolver when the loader is executed by a processor. The method includes receiving, by the loader, a first request related to an object. The object has an unresolved symbol corresponding with a direct first function call in a first module of the object. The first request is a request to resolve the symbol.

The loader resolves the symbol. In various embodiments, the resolving includes: identifying a callee function called by the first function call, identifying a second module in which the callee function is located, and determining whether the first function call corresponds with one or more properties of two or more properties.

In various embodiments, the loader returns a first callee function entry point associated with a first property of the two or more properties when the first function call has the first property. The first callee function entry point is for storing as an entry in a program linkage table (PLT) for the first function call. In some embodiments, the method includes storing the first callee function entry point in the PLT.

In various embodiments, the loader returns a second callee function entry point associated with a second property of the two or more properties when the first function call has the second property. The second callee function entry point is for storing as the entry in the PLT for the first function call. In some embodiments, the method includes storing the second callee function entry point in the PLT.

In various embodiments, the first property is that the first and second modules are the same modules and the first callee function entry point is a local entry point. In various embodiments, the second property is that the first and second modules are the different modules and the second callee function entry point is a global entry point.

In various embodiments, the first request is received when the first function call is invoked for a first time. In other embodiments, the first request is received when a loading of the first module is performed. In still other embodiments, the first request is received subsequent to a static linking of the object and prior to a loading of the first module.

In various embodiments, it is determined that the first function call corresponds with two properties of two or more properties. One of the first and second callee function entry points is a preferred callee function entry point. The method further includes selecting and returning, by the loader, the preferred callee function entry point.

In various embodiments, each of the first and second callee function entry points are associated with at least one of an expected performance metric or an expected resource usage metric. The preferred callee function entry point is determined, by the loader, by comparing the respective expected performance metrics or the expected resource usage metrics.

Additional embodiments are directed to a computer system and computer program product.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments for a loader configured to select between a plurality of entry points of a callee function for a calling function are provided, with embodiments being discussed below in detail. Each function in application object code may have a plurality of entry points inserted by, for example, a compiler. The entry points may be inserted at certain locations within the function for different reasons. Entry points may be used to enter a callee function at a certain point within the code of the callee function, which may skip parts of the code within the function.

The loader may select which entry point of the callee function to enter at runtime. When executing the executable program, a calling function of the program may perform a call to a callee function of the program. The callee function may have a plurality of entry points. The loader may determine a property of the call to the callee function. The callee function may be entered at a first entry point of the plurality of entry points when the property meets a first criterion for selecting the first entry point. The loader may insert an address to the first entry point in a procedure linkage table. The table may be adapted to be referenced by the calling function, or by another calling function in the same module as the first calling function when the other calling function performs another call to the callee function. If the property meets a criterion of another entry point and not the criterion of the first entry point, the loader may direct the call from the first function to the entry point that meets the criterion of the other entry point. Selecting different entry points may allow for a calling function whose call has certain properties in relation to the callee function to enter the callee function at a certain point to skip code that may be costly and unnecessary to run.

In various embodiments, an example of a function with a plurality of entry points within a function is a dual entry point function with regards to a global entry point and a local entry point. The global entry point, accompanied by prologue code, and a local entry point may be inserted at the beginning of each function in application object code by, for example, a compiler. During runtime, entry into a callee function at the global entry point may trigger the prologue code, which calculates and loads a table of contents (TOC) pointer value in the TOC register for the callee function. Entry into the callee function at the local entry point may skip the TOC-related operations in the prologue code, and the calling function provides the TOC pointer value for the callee function in the TOC register. Different types of function calls (i.e., local and direct, external and direct, or indirect) may use different entry points into a callee function. The calculation and saving of the TOC pointer value for the callee function may be performed based on a value that is stored in a function address register, which may be R12 in some embodiments. The TOC pointer register may be R2 in some embodiments. The numbering of the registers may be in accordance with Power® ABI, however, other computer architectures may number processor registers in other ways.

A function call in application object code is either local or external, and also either direct or indirect. For a local function call, from a calling function to a callee function that is in the same module as the calling function, the TOC pointer value is generally the same for the calling function and the callee function. (Some modules may have two or more TOC pointer values, with various functions within the module having their own TOC pointers. A call between two functions within the same module, where each function has its own TOC pointer, is treated herein as an external function call.) For an external function call, from a calling function to a callee function that is in a different module from the calling function, the TOC pointer value is different for the calling function and the callee function. Whether a function call is local or external is determined at resolution time, which may occur at various times, e.g., at compile time, link time, load time, or run time. When the type of a function call is resolved, a branch to the appropriate entry point (i.e., local or global) may be inserted in conjunction with the function call. In other circumstances, when the type of a function call is resolved, the address of the appropriate entry point may be inserted into a procedure linkage table (PLT) which is used during the call. Whether a function call is direct or indirect is indicated in the source code. A direct function call refers to the callee function by its symbol, or name. An indirect function call refers to the callee function by a function pointer which holds a value of an address corresponding to the callee function; the value of the function pointer may change during execution of the application object code.

For a direct, local function call, the calling function provides the TOC pointer value for the callee function in the TOC register; therefore, in accordance with the present invention, for a direct, local function call, the local entry point into the callee function is used. For a direct, external function call, the calling function does not know the TOC pointer value for the callee function; therefore, for a direct, external function call, the global entry point into the callee function is used. For an indirect function call, it is not known in advance whether the function call will be local or external; therefore, for an indirect function call, the global entry point into the callee function is also used.

In at least one embodiment, when a data reference to a function symbol in the symbol table is made, e.g., such as to initialize a function pointer, the data reference is initialized by a dynamic loader with the address of a global entry point. In at least one embodiment, this initialization occurs at compile time. In another embodiment, this initialization occurs at the time a module containing the reference is loaded.

In at least one embodiment, responsive to code analysis by a programmer and/or a code analysis component in a compiler, a function pointer may be initialized to a local entry point, when a determination can be made that calls to a function pointer can only be made from the local module. In further embodiments, if a callee function does not require a TOC, regardless of the type of the function call, the local entry point into the callee function is used. In at least one further embodiment, no global entry point is provided in such an instance, or a global entry point is initialized to correspond to the local entry point.

In at least one embodiment, there is provided means to make reference to a local entry point of a function symbol in a symbol table. In one embodiment, this corresponds to a programming language attribute, a pragma, or another indicator to a compiler to initialize a data value with the address of the local entry point corresponding to a function symbol. In one embodiment, this corresponds to an assembler pseudo op. In another embodiment, this corresponds to a relocation specifier. When a data reference to a local entry point of a symbol in the symbol table is made, e.g., such as to initialize a function pointer, the data reference is initialized by a dynamic loader with the address of a local entry point. In at least one embodiment, this initialization occurs at compile time. In another embodiment, this initialization occurs at the time a module containing the reference is loaded. In at least one embodiment, a reference to the local entry point of a symbol in the symbol table is only resolved at static link time, and an error is issued when the symbol remains unresolved at static link time. In at least another embodiment, a reference to the local entry point of a symbol in the symbol table may be resolved at module load time (dynamic link time), and an error may be issued when the symbol cannot be resolved from the local symbol table.

In various embodiments, when making a direct call to a callee function the linker and the compiler may not know whether the direct call is to a local function or a global function. Therefore, a compiler may insert a placeholder for a store and restore of the calling function's TOC pointer value when a call to the callee's function is made. The linker may link a PLT stub code to the TOC placeholder of the calling function for use when the calling function calls the callee function. The linker makes this link because the linker will assume the function is a global function when the type of function is unknown. The PLT stub may save the TOC pointer value for the calling function within a stack frame and the stub may transfer execution to the global entry point address of the callee function. In another embodiment, the static linker may initialize the placeholder to save the TOC pointer value and generate a PLT stub without a TOC pointer value save instruction. This is to ensure that the caller's TOC pointer value can be recovered if the prologue code that is executed in the callee function calculates and uses a different TOC pointer value. However, if the call is actually a local call to a local function, the calculation and saving of the TOC pointer value is unnecessary and uses processing resources to complete. It also introduces unnecessary dependences of instructions referencing the TOC register to address variables on the instructions of the prologue, and transitively, on the instructions loading the function entry address. In various embodiments, the loader 107 may determine whether the call is a global call or a local call and may provide a table used by the PLT stub with an address to a local entry point when the call is determined to be local. In one embodiment, this is performed by initializing a value in a look up table, e.g., a PLT, used by the PLT stub code generated by the static linker 106 when it was unable to determine that a symbol corresponds with a local call. In another embodiment, this may involve generating and inserting a call instruction to the local entry point of the function. Generally, in various embodiments, the loader 107 may select between a plurality of entry points in a callee function when resolving a symbol corresponding with a calling function based on one or more properties of the call.

Figure 1:
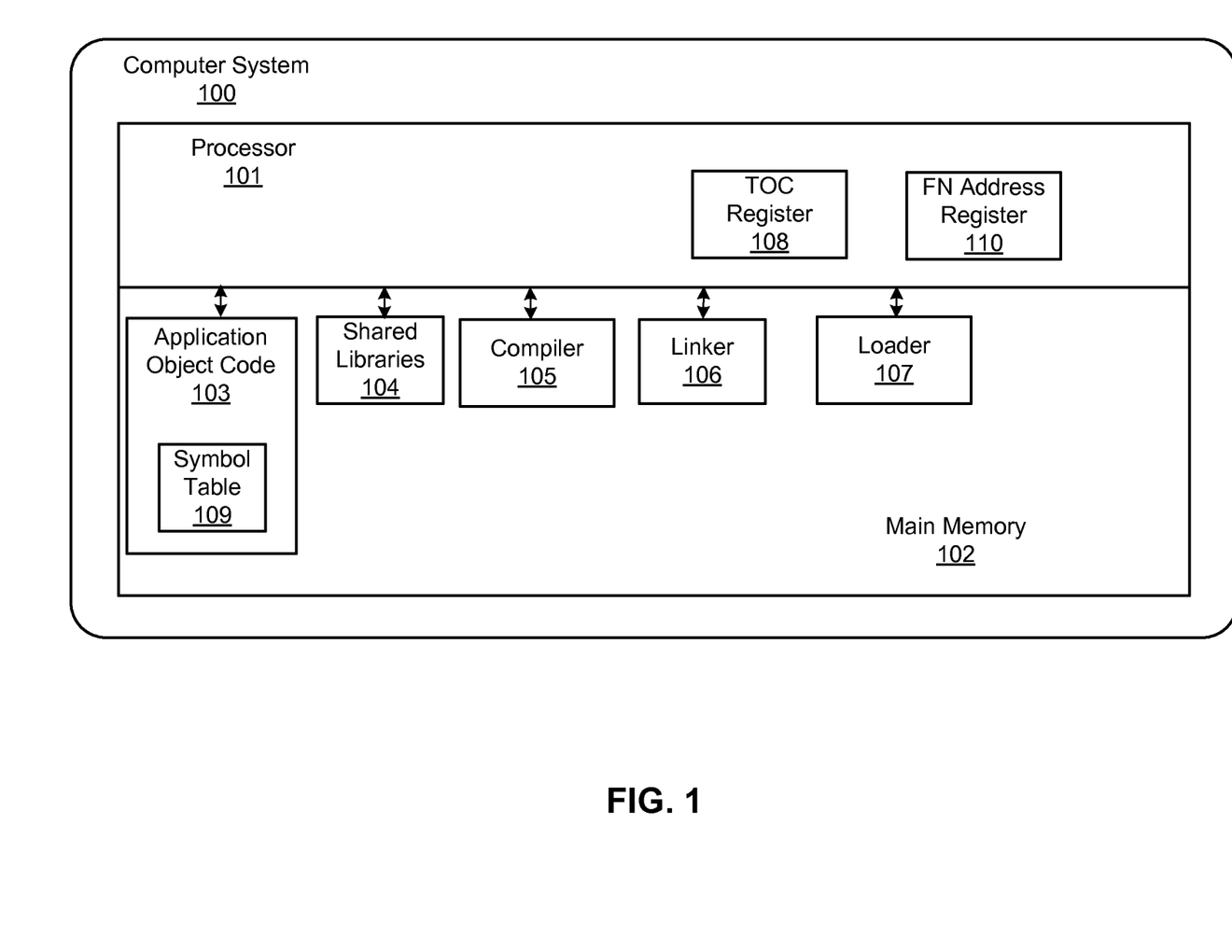
FIG. 1 depicts a computer system having a loader configured to select between a plurality of entry points of a callee function in accordance with an embodiment.

FIG. 1 illustrates an embodiment of a computer system 100 having a loader 107 that is adapted to select between a plurality of entry points of a callee function. Computer system 100 comprises a processor 101 and a main memory 102. Application object code 103, which is generated from program source code (not shown) by a compiler, such as compiler 105, includes a plurality of functions, and is stored in main memory 102 for execution by processor 101. The application object code 103 may be generated by a compiler that is located on a different computer system from computer system 100. Application object code 103 may include a symbol table 109, which may be generated by the compiler 107 when the application object code 103 is generated. The symbol table 109 may include a data structure that associates each identifier (i.e., function and variable names) in a program's source code with information relating to its declaration or appearance in the source code, such as type, scope level, and/or location. The symbol table may also indicate local and global entry points, which is described further within. Shared library code 104 may include functions that are external to application object code 103 and that may be called during execution of application object code 103 via external function calls (i.e., calls to functions in other modules and also referred to herein as global function calls).

Linker 106 and loader 107 may include runtime components; the linker 106 links the application object code 103 before the application object code 103 is executed by the loader 107. The loader 107 may be referred to as herein as dynamic loader, dynamic linker, or a resolver. The loader 107 may include components that perform the functions of a dynamic loader, dynamic linker, or a resolver. Specifically, the loader 107 may resolve an unresolved symbol corresponding with a function call: (a) after static linking but prior to loading an executable object; (b) after loading, at startup of the executable object; or (c) after the executable object is running, such as when the instruction with the unresolved symbol is encountered. The loader 107 may be configured to determine an entry point of a function having a plurality of entry points. The function may be from the application object code 103 or the shared libraries 104.

TOC register 108 is located in processor 101. TOC register 108 stores a current value of a TOC pointer for the currently active function of application object code 103 or shared library code 104 (i.e., the function that is currently executing). The TOC register 108 may be general purpose register R2 in some embodiments. In further embodiments of a computer systems, such as computer system 100, the TOC register 108 may store a GOT value instead of a TOC pointer value. Function address register 110 is also located in processor 101, and holds an address of a currently executing function. Function address register 110 may be general purpose register R12 in some embodiments. Function address register 110 may be an address register, such as a CTR register, in some embodiments. In some embodiments, the computer system 100 may further comprise another object code module that is distinct from the application object code 103 and the shared library code 104, and the other object code module may also contain functions that are called by application object code 103 via external function calls.

Figure 2:
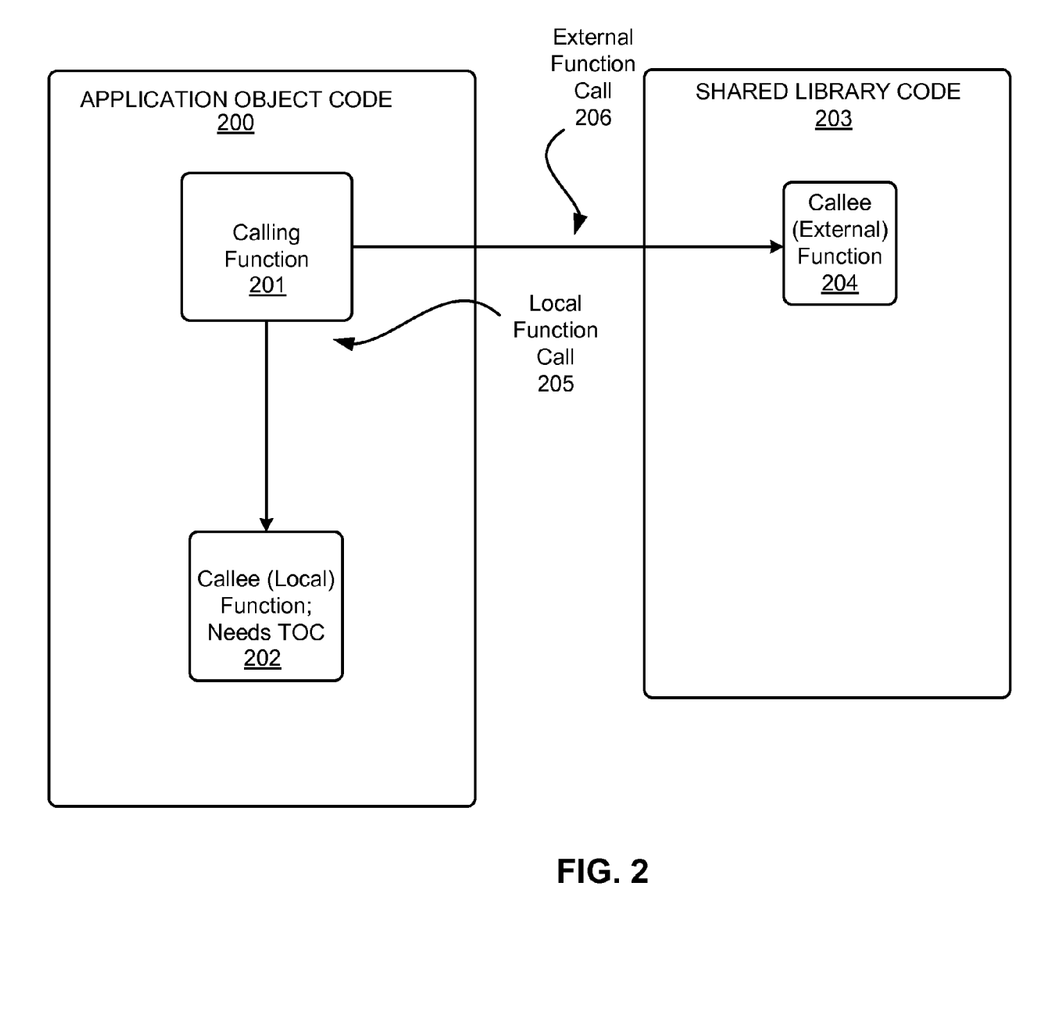
FIG. 2 depicts local and external function calls in accordance with an embodiment.

FIG. 2 illustrates an embodiment of a local function call 205 and an external function call 206. Application object code 200 may include application object code 103 of FIG. 1, and shared library 203 may include shared library code 104 of FIG. 1. Calling function 201 and callee function 202 are part of application object code 200, and callee function 204 is part of shared library 203. If the calling function 201 and the callee function 202 are both part of application object code 200, the callee function 202 is local to the calling function 201 and the call is a local function call 205. Therefore, the calling function 201 and the callee function 202 have the same TOC pointer value. If the calling function 201 is part of the application object code 200, and the callee function 204 is in the shared library 203, then the callee function 204 is external to the calling function 201 and the call is an external function call 206. Therefore the calling function 201 and the callee function 204 may have different TOC pointer values.

When calling function 201 performs an external function call to callee function 204, and when execution passes from the calling function 201 to the callee function 204, then the value of the TOC pointer of the calling function 201 is saved from TOC register 108 to a stack frame corresponding to the calling function 201 in the runtime stack. Then, the TOC pointer value of callee function 204 is stored in TOC register 108. When the callee function 204 exits and execution passes back to the calling function 201, the value of the TOC pointer of the calling function 201 is restored to the TOC register 108 from the stack frame corresponding to the calling function 201.

In at least one instance, a static linker 106 cannot determine whether a symbol associated with a call 205 corresponds to a local or an external function call. Because the symbol may correspond to an external call, when the linker 106 resolves calls from calling function 201, if the linker cannot determine that the symbol associated with the call 205 corresponds to a local call, the static linker conservatively generates the code necessary to perform an extern call. (An extern call is a call from one module to another.) Specifically, the static linker 106 generates code to save the value of the TOC pointer of the calling function 201 from TOC register 108 to a stack frame corresponding to the calling function 201 in the runtime stack using either a TOC save placeholder, or using an instruction in a PLT stub code; PLT stub code is generated to cause resolution of the symbol at runtime, and to call the so resolved function. In addition, the static linker 106 generates code to restore the pointer of the calling function to the TOC register upon return from the called function.

When execution of the application is passed to the call site for local call 205, steps corresponding to the various embodiments are executed by the loader 107 (dynamic linker), and the application. The loader 107 resolves the symbol to the local entry point corresponding to the symbol, from the local symbol table. The program executes the called function starting at the local entry point while reusing the TOC value of the caller. Advantageously, instructions corresponding to the TOC load of the external entry point, and data dependences of data accesses on the FN address register 110 are avoided.

FIG. 2 is shown for illustrative purposes only; any number of functions may be included in application object code 200 and shared library 203, and these functions may call one another in any appropriate manner. In some embodiments, the computer system 100 may further comprise another object code module that is distinct from the application object code 103/200 and the shared library code 104/203, and the other object code module may also contain functions that are called by application object code 103/200 via external function calls such as external function call 206. There may also be local function calls between functions that are both within the same shared library code 104/203.

Figure 3:
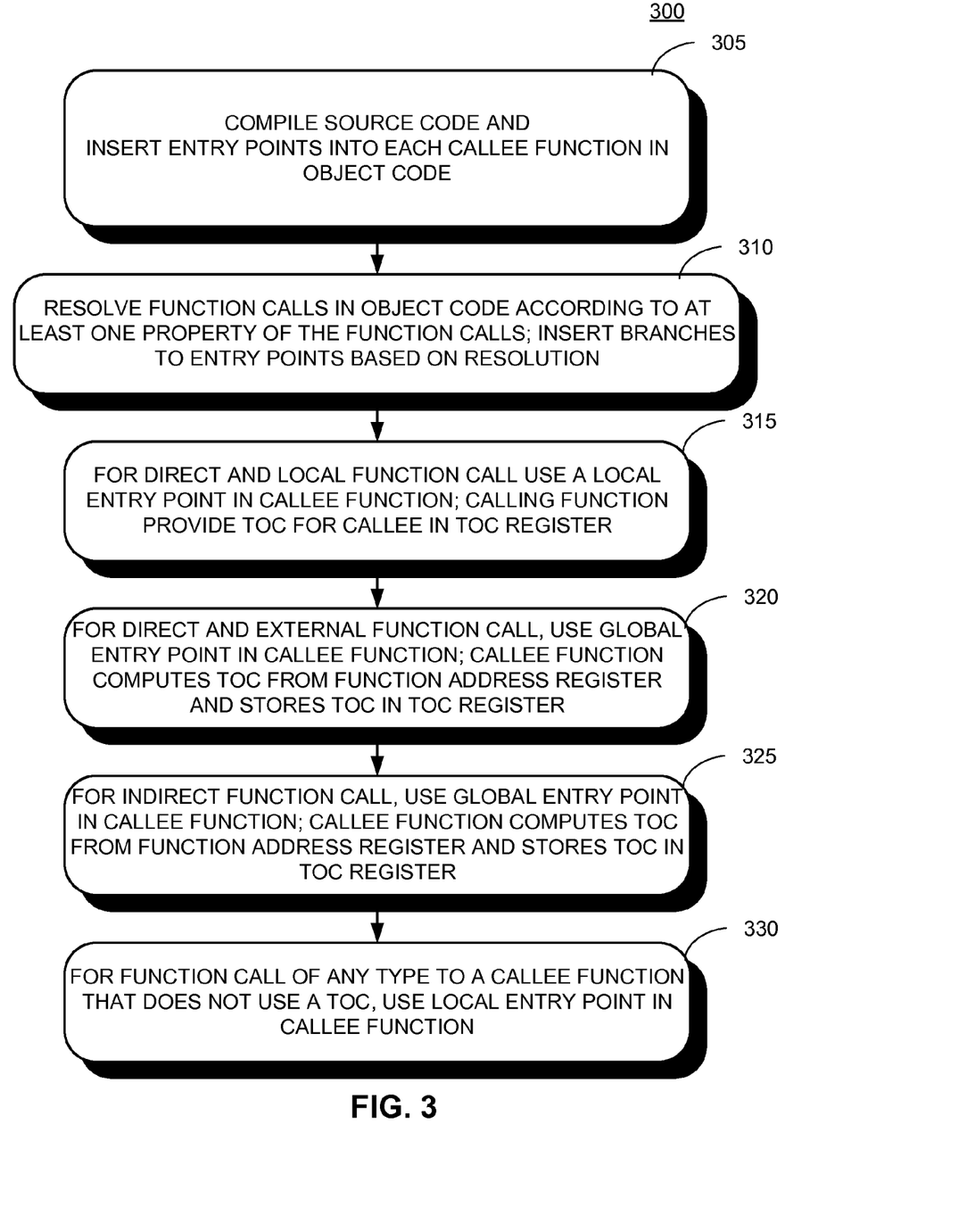
FIG. 3 depicts a process flow for generally resolving a call to a callee function having a plurality of entry points in accordance with an embodiment.

FIG. 3 illustrates an example of a method 300 for selecting one of a plurality of entry points, such as a global entry point and a local entry point, for a callee function in accordance with an embodiment. Although this example refers to a global entry point and a local entry point, a plurality of entry points may be considered as well as other entry points defined by other properties besides global or local calls. FIG. 3 is discussed with reference to FIGS. 1 and 2. First, in operation 305, before runtime, a compiler, such as compiler 105, generates application object code 103 (and, in some embodiments, shared library code 104) from program source code (not shown). The compiler that generates application object code 103 (and, in some embodiments, shared library code 104) may be located on another computer system that is distinct from computer system 100. In some embodiments, another compiler on a third distinct computer may generate shared library code 104. During compilation, the compiler 105 inserts multiple entry points and other code. For example, the compiler may insert a global entry point at the beginning of each callee function, followed by prologue code comprising instructions to compute and load the TOC pointer value for the callee function, followed by a local entry point. The main body of a function may be located after its local entry point. It is also indicated in the program source code whether each function call is direct or indirect; a direct function call calls the calling function by name, while an indirect function call references a function pointer.

In at least one embodiment, a symbol table is created. In one symbol table format, each type of entry point is separately included in a symbol table, in conjunction with an encoding of the properties of the entry point (e.g., whether the entry point corresponds to a first or a second property, such as a first local and second global entry point, respectively, and/or other entry point properties in addition or in lieu of the exemplary local end global entry points.) In another embodiment, a plurality of entry points (and optionally, in one embodiment, all entry points) corresponding to a symbol, are collected in a single symbol table entry corresponding to the function symbol, reducing the size of the symbol table and accelerating symbol table lookup. In at least one embodiment, a symbol table indicator indicates whether an entry specifies one or multiple such entries.

In at least one embodiment, the entry point addresses in the symbol table are compressed. A first entry point is stored. An indication on how to compute a second entry point from the first entry point can also be stored. In one embodiment, the first entry point is the global entry point. In one such embodiment, an indication is made of a distance of a local entry point from the global entry point. At least one of a compiler, an assembler, and a linker compute a distance from a first, e.g., global, to a second, e.g., local, entry point and store it in the symbol table. In another embodiment, the first entry point is a local entry point, and the second compressed entry point address corresponds to the global entry point. In one such embodiment, an indication is made of a distance of a global entry point from the local entry point. At least one of a compiler and a linker compute a distance from a first, e.g., local, to a second, e.g., global, entry point and store it in the symbol table. In another embodiment, a first and second entry points correspond to other properties. In one embodiment, the distance is stored as a numeric field in the symbol table. In another embodiment, the distance is encoded, and only certain distances can be indicated. For example, the distances can be 1, 2, 4, 8, or 16 instructions from an entry point. A compiler, assembler or linker may pad the code between entry points, e.g., with no-operation instructions to achieve a suitable distance which can be encoded. In another embodiment, the presence of a plurality of entry points, and a distance between them are encoded as a single value. In one such embodiment, this corresponds to a plurality of bits in a symbol table field. In at least one embodiment using the ELF object file format, the encoding is stored in a plurality of bits of an st_other field in accordance with the ELF object file format. The Executable and Linkable Format (ELF) defines a common linking interface for executables, object code, and shared objects. In various embodiments, a particular value, e.g., zero, can be stored in the st_other field to indicate that a function has a single entry point. This particular value may be used for functions that do not require use of a TOC register to access external data. In other embodiments, a number of low order bits for a second entry point are specified to replace a number of low order entry points of a first address.

Figure 4:
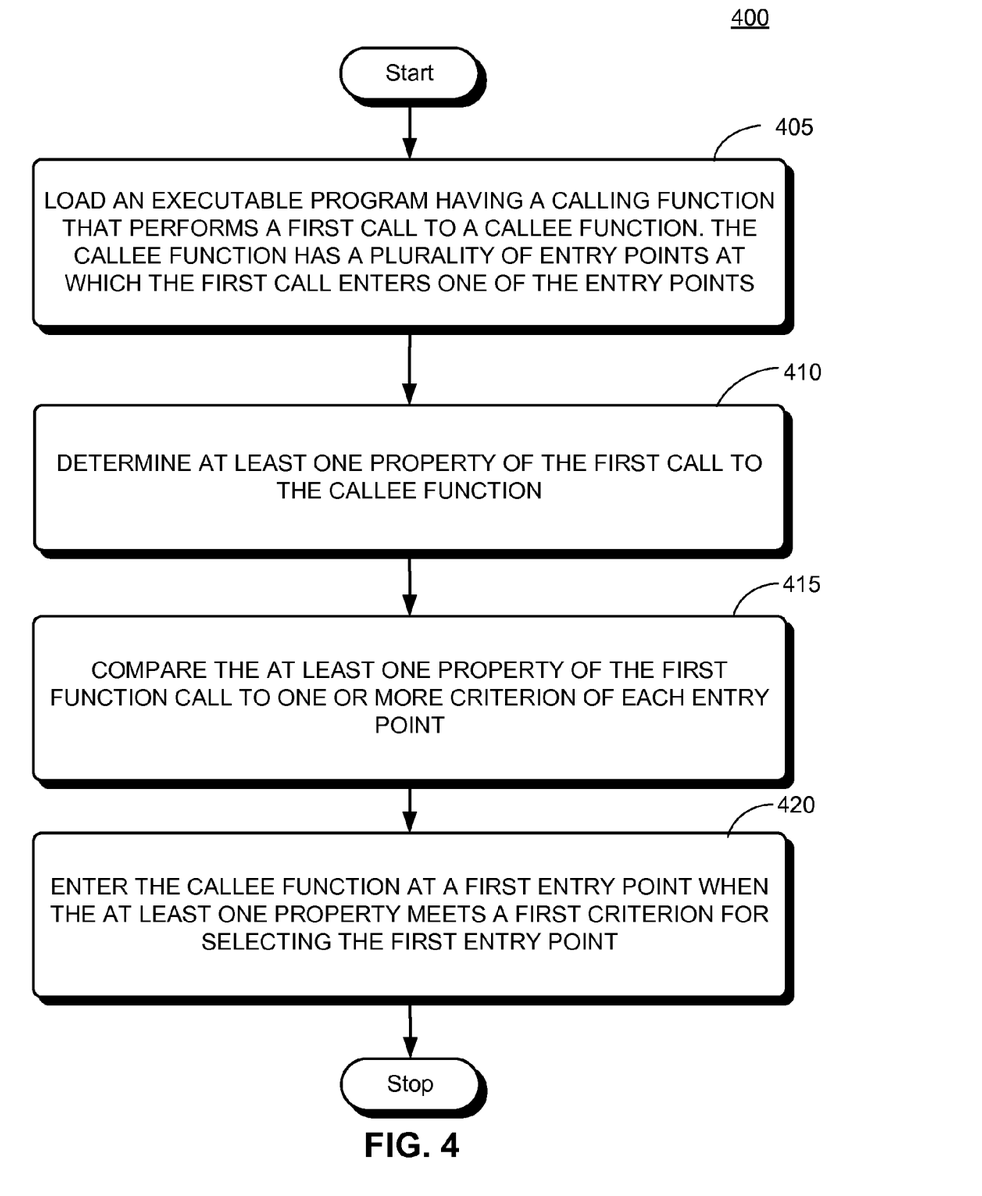
FIG. 4 depicts a process flow for a loader to resolve a call to a callee function having a plurality of entry points in accordance with an embodiment.

Next, in operation 310, symbols corresponding with the function calls in the calling functions in the application object code 103 are resolved based on at least one property of the function calls (e.g., local or external). The resolving may be performed by compiler 105, linker 106, or loader 107, in various embodiments; resolution may occur at different times for different function calls in the same application object code 103. FIG. 4, discussed below, illustrates a method of resolving, by the loader 107 during runtime, a symbol corresponding with a function call to a callee function with a plurality of entry points. The plurality of entry points may be a global entry point and a local entry point, for example. At the time of resolution of a function call, one of either the compiler 105 or linker 106 inserts instructions that branch from the function call in the calling function to one of the plurality of entry points of the callee function of the function call, depending on the type of function call (e.g., direct and local, direct and external, or indirect), in addition to other instructions, such as PLT stubs, as needed. In another embodiment, a static linker generates code for an external call, and causes a loader 107 (dynamic linker) to resolve a symbol using a PLT stub. As described with reference to FIG. 4, the loader 107 (dynamic linker) inserts at runtime a function address to a local or external entry point into an address table, e.g., a procedure linkage table that is used by a PLT stub code.

In the example where the plurality entry points of a function are selected based on the at least one property of the function call being local or external, and direct or indirect, operations 315, 320, 325, and 330 may be performed during execution of the application object code 103. For each function call that is encountered during execution of application object code 103, one of operation 315, 320, 325, and 330 is performed. In operation 315, a direct and local function call is executed. For the direct and local function call, the calling and callee functions have the same TOC, which may be provided by the calling function for the callee function in the TOC register 108. Therefore, the function call in the calling function branches to the local entry point in the callee function, skipping the global entry point and the prologue code that includes the callee TOC computation and load instructions. This reduces processor cycles needed to execute the object code. In such an embodiment, a TOC save and restore instruction may still be executed, when a local call is performed, but the TOC load that would be performed when the called function is called via its global entry point is bypassed.

In at least one embodiment, the operation of the loader 107 (dynamic linker) includes performing a lookup of a symbol table, and computing a second entry point address (e.g., the local entry point address) from a first entry point address (e.g., the global entry point address) when a compressed symbol table format is used. Computing a second entry point address may include one or more of decoding a symbol table indicator, decoding a distance between a first and a second entry point, modifying a first entry point address by the decoded distance to compute a second entry point address, and storing the decoded entry point address in at least one table entry of a procedure linkage table.

In operation 320, a direct and external function call is executed. For the direct and external function call, the calling and callee functions may have different TOC values, so the callee function may calculate its TOC pointer value and load the calculated TOC pointer value in the TOC register 108. Therefore, the function call in the calling function branches to the global entry point in the callee function, executes the prologue code to perform TOC pointer value computation, saves the computed TOC pointer value in the TOC register 108, and then proceeds past the local entry point into the body of the callee function.

In operation 325, an indirect function call is executed. For the indirect function call, the TOC pointer value of the callee function may not be known in advance, so the callee function may calculate its TOC pointer value and load the calculated TOC pointer in the TOC register 108. Therefore, the function call in the calling function branches to the global entry point in the callee function, executes the prologue code to perform TOC pointer value computation and loads the computed TOC pointer value in the TOC register 108, and then proceeds past the local entry point into the body of the callee function.

In one embodiment, a function pointer is initialized by the compiler to the address of the global entry point corresponding to a function symbol. In another embodiment, a function pointer is initialized by the static linker to the address of the global entry point corresponding to a function symbol. In yet another embodiment, a function pointer is initialized by the loader 107 (dynamic linker) to the address of the global entry point corresponding to a function symbol when a module is first loaded. Corresponding to an embodiment where a function pointer is initialized by the loader 107, when a module is loaded, symbol table lookups are performed. Properties of function calls are determined. An entry point corresponding to a first property of a function symbol is determined, and a location corresponding to a function pointer is initialized with the address corresponding to the entry point.

Lastly, in operation 330, a function call to a callee function that does not use a TOC pointer value in the TOC register 108 is executed. In some embodiments, for such a function call, the local entry point in the callee function may be used, regardless of the type of the function call. In further embodiments, the compiler may determine at compile time that the callee function does not use a TOC register for a TOC pointer value, and, based on that determination, omit insertion of the prologue code into the callee function during operation 305.

FIG. 4 illustrates a flow diagram of a method 400 to resolve a symbol corresponding with a function call to a callee function having a plurality of entry points by a dynamic loader 107 according to various embodiments. After the compiler inserts a plurality of entry points within a plurality of functions of the object code, then the compiler may resolve a function call from a calling function to a callee function. The call may be resolved when the compiler inserts instructions that branch from the function call in the calling function to one of the plurality of entry points of the callee function of the function call at compile time. In various embodiments, the compiler may indicate to a static linker to resolve the function call at compile time. In various embodiments, the linker may resolve the function call at link time.

In various embodiments, the compiler and linker may not be able to resolve a function call to a callee function having a plurality of entry points because there may be uncertainty with certain function calls as to which entry point to enter. A loader, such as loader 107, may be used because the loader 107 may know with certainty at runtime whether a call has certain properties. When the linker, such as linker 106 of FIG. 1, cannot resolve the call to one of the plurality of entry points, the linker automatically may plan for a "safe" entry point of the plurality of entry points of the callee function. For example, when there is a global entry point and a local entry point as the plurality of entry points and the linker does not know whether the call should be resolved to one or the other, then the linker 106 may issue PLT stub code to direct the function call to the global entry point. This is because entry to the global entry point guarantees that the calling function's TOC pointer value will be saved and a TOC pointer value of the callee function may be calculated by adding a constant to the global entry point address from the function address register 110 of FIG. 1. The calculated TOC pointer value may be loaded into the TOC register 108.

During runtime, the loader 107 may determine which of the plurality of entry points to enter. In operation 405, the loader 107 may load an executable program. The object code may have a calling function that performs a first function call to a callee function. The callee function has a plurality of entry points at which the first function call may enter. The first function call may have at least one property associated with it. In various embodiments, the first function call may be a direct function call. While in some instances, only a single property matches the property of a call to a call site (e.g., a local call site without TOC save and restore requires a local entry point, and a function pointer commonly requires a global entry point), in other instances, more than one property may match a property of a call to a function call site (e.g., a local call that is performed via a sequence for an external call and including TOC save and restore may be resolved with either a local and a global entry point). In an instance where more than one property matches a property of a call, one entry point is selected based on a preference, priority, or rank, e.g., corresponding to expected performance and resource usage of using one of at least a first and second entry point corresponding to such properties. In one embodiment, the preference of an entry point is static (e.g., a local entry point is always preferable to a global entry point), whereas in another embodiment, a symbol table may associate a cost metric based upon which a dynamic linker 107 can pick—for each function—a preferred entry point based on the specified cost for the choices available for such function.

In operation 410, the loader 107 may determine at least one property of a symbol associated with the first function call from the calling function to the callee function. In various embodiments, each function call may have at least one property associated with it. For example, the function call may have a property of being a call to a local function. Another property the function call may have is that the function call is a call to an external function from that of the calling function. The loader 107 may access a symbol table to determine one or more properties of the symbol associated with the first function call.

In operation 415, the loader 107 may compare the at least one property to one or more criterion of a first entry point of the callee function. If the at least one property meets conditions of a criterion, then the loader may resolve the symbol corresponding with the calling function to enter the callee function at the first entry point in operation 420. If the at least one property meets conditions of a second criterion, then the loader 107 may resolve the symbol corresponding with the calling function to enter the callee function at a second entry point. Entering a second entry point over a first entry point, or vice versa, may skip executing code between the two entry points. In various embodiments, when the at least one property does not meet a criterion, then an error is issued. In various embodiments, a programmer or the compiler may generate a default entry point that may be used when no other criterion is met.

In various embodiments, multiple criteria for multiple entry points may be met by the at least one property. In a situation where more than one entry point may be selected, the loader 107 (dynamic linker) may select one of the entry points at random. In various embodiments, the loader 107 may select one of the multiple entry points based off of a priority of the entry points. One entry point may be preferable over the other. For example, a local entry point may be preferable over a global entry point because when a calling function enters a callee function at a local entry point, processor resources may not have to be used to calculate and load the callee function's TOC pointer value in the TOC register 108 of FIG. 1. This may be an example of an implicit priority. In other embodiments, the priority may be an explicit priority where each entry point is explicitly given preference over another.

With regards to the local entry point and global entry point example, if the at least one property of the function call is a local call and the criterion of the first entry point is a local call, then the loader 107 (dynamic linker) may resolve the function call to the first entry point. If the at least one property of the function call is an external call and the criterion of the second entry point is an external call, then the loader 107 may resolve the function call to the second entry point. If both criterion are met by the at least one property, the loader 107 may be configured to select one of the entry points. In various embodiments, the loader 107 may select one of the entry points based on an explicit or implicit priority. The second entry point supporting local calls may have a higher priority due to not having to execute prologue code of calculating and loading a TOC pointer value. In various embodiments, the first entry point supporting global functions may be selected when the at least one property does not meet any of the criterion because the correct TOC pointer value will be loaded with certainty.

In various embodiments, the loader 107 resolves a symbol and determines its properties and the target address using a symbol table, such as symbol table 109 of FIG. 1, during a function call. Two or more addresses (entry points) may be associated with a particular symbol in the symbol table. For the symbol table to have multiple target addresses for the callee function, the symbol table may encode the address for a single entry point of the callee function within a single symbol. In an embodiment, the symbol may correspond to a first entry point, which may be, for example, a global entry point. Along with the symbol may be a stored offset corresponding to the second entry point, which may be, for example, a local entry point. In various embodiments, the offset between the first and the second entry points may be stored in another area of the object file (e.g., as part of a text, a data, and an extended section). In various embodiments, multiple symbols may be available corresponding to the plurality of entry points for the same function. Criterion information may be provided with each symbol.

In one particular embodiment, the symbol table contains the address of the global entry point, and a field in the symbol table, such as, for example, "st_other" which is used to encode the distance of a local entry point from a global entry point. In accordance with one such embodiment, the code corresponding to a global entry point loads the TOC pointer value. In accordance with one embodiment, the TOC pointer value is loaded by adding a known distance from the global entry point of the function to the value of said entry point, e.g., when it is loaded in a register, such as in function address register 110, (i.e. register r12).

Thus, in various embodiments, the code for a callee function g( ) contains the following, assuming the function entry point is in r12 when the global entry point is called, and r2 contains a shared TOC pointer value when the local entry point is shared:

g_global_entry:
   addis r2, r12, (.TOC.-g_global_entry)@ha
   addi r2, r2 (.TOC.-g_global_entry)@l
g_local_entry:
   ...
   blr In at least one embodiment, a compiler or programmer issues a directive to indicate the location of the local entry point and cause a local entry point indicator to be inserted into the symbol table, rather than using separate symbols for global and local entry points:

g:
   addis r2, r12, (.TOC.-g)@ha
   addi r2, r2 (.TOC.-g)@l
   .localentry g, .-g
   ...
   blr In accordance with various embodiments, when a function returns after being called via a local entry point, the value of the TOC register (e.g., in r2 in the specific example) which is shared with the caller is unchanged, and the callee does not need to restore the value in r2. When a function returns after being called via a global entry point, the value of the TOC register, (e.g., in r2 in the specific example) which is not shared with the caller, has been changed, and the caller needs to restore the TOC pointer value in the TOC register to the saved value to obtain its own TOC for use to establish addressability to the caller's data. In accordance with an embodiment, the symbol table stores the addresses for g_global_entry and g_local_entry addresses in conjunction with the symbol for function g( ). In accordance with various embodiment, the symbol table stores the address of g_global_entry in the symbol table and indicates a distance of two instructions to a local entry point. In one embodiment, the distance is directly stored. In various embodiments, the distance is encoded, e.g., using the st_other field. In various embodiments, a distance of two instructions corresponds to a value of st_other=3. In accordance with various embodiments, "st_other" can encode a variety of distances and other information. In one embodiment, the value to be entered in the symbol table for a plurality of bits encoding multiple properties corresponds to the value specified to a .localentry pseudo assembly instruction, when the compiler generates assembly source code rather than generating object code directly.

In various embodiments, the loader 107 stores the determined target address in a procedure linkage table. In various embodiments, when linking to an external function, the linker 106 generates code and, when the code is executed, the global entry point is loaded into a register from a procedure linkage table (the address having previously been stored thereto by the loader 107) and branches to the obtained address in a register.

Figure 5:
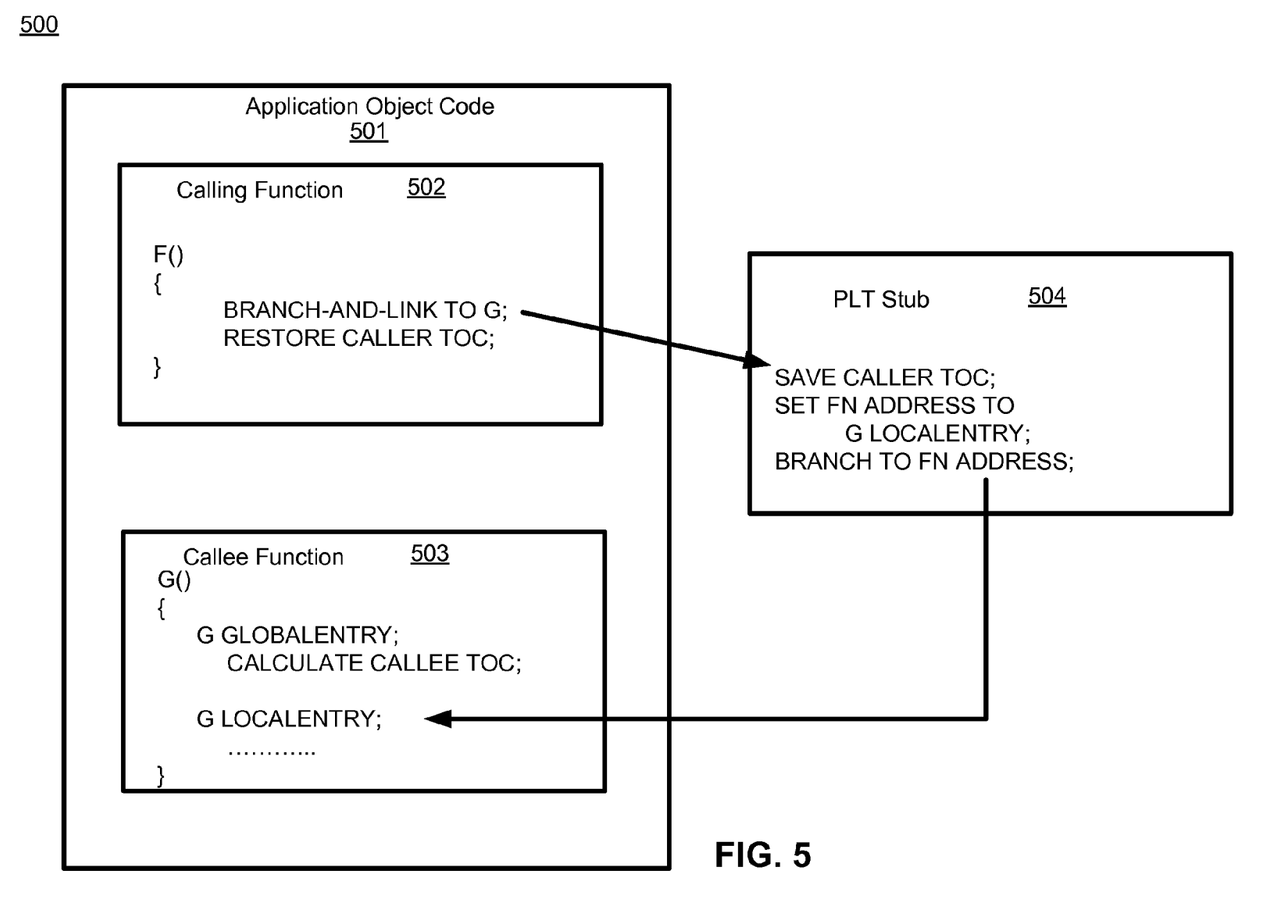
FIG. 5 depicts an example of use of a local entry point as one of a plurality of entry points of a callee function in accordance with an embodiment.

FIG. 5 illustrates examples of use of a local entry point for a local and direct function call according to various embodiments. In FIG. 5, the resolution of a symbol associated with the function call can occur after static linking but prior to loading or at load time or at runtime. In FIG. 5, the calling function and the callee function share the same TOC, and the TOC pointer value is provided for the callee function by the calling function in the TOC register 108. In example 500 of FIG. 5, resolution that the function call from calling function F( ) 502 to callee function G( ) 503 is a local function call (i.e., F( ) and G( ) are both in application object code 501) occurs during load time. The function call from calling function F( ) 502 to callee function G( ) 503 is also determined to be a direct function call because G( ) is called in F( ) by name. Therefore, the linker 106 generates a PLT stub 504 and inserts a branch to the PLT stub 504 into calling function F( ) 502. The PLT stub 504, when executed, stores the TOC pointer value of the calling function F( ) 502 in the stack frame associated with F( ) in the runtime stack, loads a final destination address to be determined by the loader 107 at load time into the function address register 110, and then branches to the address in the function address register 110. In this example, the loader 107 determines that the address of the local entry point in callee function G( ) 503 should be used. The loader 107 determines that the local entry point should be used based on one or more properties of the symbol. The loader 107 may access the symbol table to determine one or more properties. When the loader 107 selects the local entry point, it saves the address of the local entry point in the procedure linkage table, which is accessed by the PLT stub 504. It is this local entry point address in the procedure linkage table that the PLT stub loads into the function address register 110, which is then referred to herein as the final destination address. The linker 106 also inserts code into the calling function F( ) to restore its TOC pointer value from the stack frame associated with F( ) in the runtime stack after the call to G( ) has returned. For the function call from F( ) to G( ), the global entry point in G( ) 503, and the prologue code that performs computation of the TOC for G( ) 503, are skipped.

Figure 6:
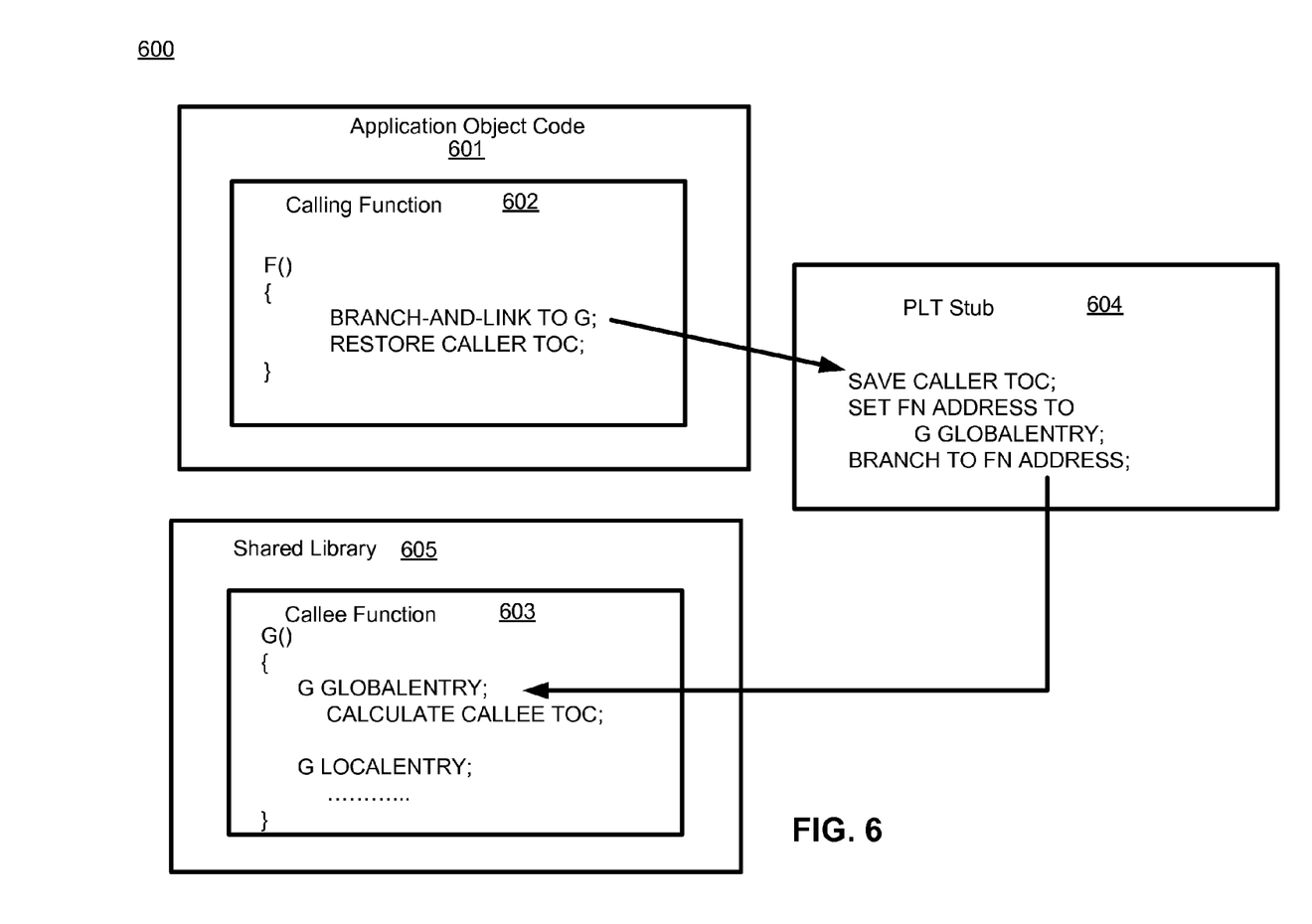
FIG. 6 depicts an example of use of a global entry point as one of a plurality of entry points of a callee function in accordance with an embodiment.

FIG. 6 illustrates an example of use of a global entry point for an external and direct function call. In example 600 of FIG. 6, the resolution that the function call from calling function F( ) 602 to callee function G( ) 603 is an external function call (i.e., F( ) and G( ) are in the different respective modules, e.g., application object code 601 and shared library 605) can occur after static linking but prior to loading or at load time or at runtime. The function call from calling function F( ) 602 to callee function G( ) 603 is also determined to be a direct function call because G( ) is called in F( ) by name. Therefore, the linker 106 generates a PLT stub 604 and inserts a branch to the PLT stub 604 into calling function F( ) 602. The PLT stub 604, when executed, stores the TOC pointer value of the calling function F( ) 602 in the stack frame associated with F( ) in the runtime stack, loads a final destination address to be determined by the loader 107 at load time into the function address register 110 and then branches to the address in the function address register 110. In this example, the loader 107 determines that address of the global entry point in callee function G( ) 603 should be used. The loader 107 determines that the global entry point should be used based on one or more properties of the symbol. The loader 107 may access the symbol table to determine one or more properties. When the loader 107 selects the local entry point, it saves the address of the global entry point in the procedure linkage table 604, which is accessed by the PLT stub. It is this global entry point address in the procedure linkage table that the PLT stub loads into the function address register 110, which is then referred to herein as the final destination address. The linker 106 also inserts code into the calling function F( ) to restore its TOC pointer value from the stack frame associated with F( ) in the runtime stack after the call to G( ) has returned. After entering callee function G( ) 603 at the global entry point, the prologue code performs a calculation of the TOC pointer value for callee function G( ) 603 and loads the calculated TOC pointer value for the callee function G( ) 603 into the TOC register 108 before proceeding with execution of the callee function G( ) 603. The TOC pointer value for callee function G( ) 603 may be calculated based on adding an offset value to the value that is stored in the function address register 110.

The examples in FIGS. 5 and 6 illustrate a direct function call in calling modules being replaced with a branch to a PLT stub that contains an indirect branch. The procedure linkage table can be initialized after static linking but prior to loading or at load time or at runtime by the loader 107. Once initialized, the indirect branch in the PLT stub will point to either the local or global entry point.

If the PLT has not been initialized to contain either the local or global entry point of the desired function, it contains the address of a piece of code that will contain a call to a resolver component of the loader 107. The resolver determines one or more properties of the call, selects a local or global entry point, determines an address of the entry point, and stores that entry point in the PLT, so subsequent branches by the indirect branch go to either the selected local or global entry point. Technical effects and benefits include reduction in unnecessary TOC pointer value calculation and load operations during execution of application object code.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   executing a loader having a resolver by a processor, the loader:
      receiving a first request related to an object, the object having an unresolved symbol corresponding with a direct first function call in a first module of the object, the first request being a request to resolve the symbol;
      resolving the symbol by:
         identifying a callee function called by the first function call,
         identifying a second module in which the callee function is located,
         determining whether the first function call corresponds with one or more properties of two or more properties,
         returning a first callee function entry point associated with a first property of the two or more properties when the first function call has the first property, wherein the first callee function entry point is selected for storing as an entry in a program linkage table (PLT) for the first function call;
      returning a second callee function entry point associated with a second property of the two or more properties when the first function call has the second property, wherein the second callee function entry point is selected for storing as the entry in the PLT for the first function call; and
      returning a preferred callee function entry point when it is determined that the first function call corresponds with two properties of two or more properties, wherein the preferred callee function entry point is selected for storing as the entry in the PLT for the first function call, and one of the first and second callee function entry points is the preferred callee function entry point.

2. The method of claim 1, wherein the first property is that the first and second modules are the same modules and the first callee function entry point is a local entry point.

3. The method of claim 1, wherein the second property is that the first and second modules are the different modules and the second callee function entry point is a global entry point.

4. The method of claim 1, wherein the first request is received when the first function call is invoked for a first time.

5. The method of claim 1, wherein the first request is received when a loading of the first module is performed.

6. The method of claim 1, wherein the first request is received subsequent to a static linking of the object and prior to a loading of the first module.

7. The method of claim 1, wherein each of the first and second callee function entry points are associated with at least one of an expected performance metric or an expected resource usage metric and the preferred callee function entry point is determined by comparing the respective expected performance metrics or the expected resource usage metrics.

* * * * *